US011678351B2

(12) United States Patent
Fan et al.

(10) Patent No.: US 11,678,351 B2
(45) Date of Patent: Jun. 13, 2023

(54) SCHEDULING RADIO RESOURCES USING FIRST AND SECOND CONFIGURATION

(71) Applicant: HUAWEI TECHNOLOGIES CO., LTD., Guangdong (CN)

(72) Inventors: Qiang Fan, Shenzhen (CN); Qufang Huang, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 160 days.

(21) Appl. No.: 16/994,023

(22) Filed: Aug. 14, 2020

(65) Prior Publication Data

US 2020/0374888 A1  Nov. 26, 2020

Related U.S. Application Data

(63) Continuation of application No. PCT/CN2019/073634, filed on Jan. 29, 2019.

(30) Foreign Application Priority Data

Feb. 14, 2018 (CN) .......................... 201810152214.9

(51) Int. Cl.
*H04W 72/04* (2009.01)
*H04W 28/02* (2009.01)
(Continued)

(52) U.S. Cl.
CPC ................. *H04W 72/0493* (2013.01); *H04W 28/0278* (2013.01); *H04W 72/0413* (2013.01);
(Continued)

(58) Field of Classification Search
CPC ......... H04W 72/0493; H04W 28/0278; H04W 72/0413; H04W 72/0446; H04W 72/1268;
(Continued)

(56) References Cited

U.S. PATENT DOCUMENTS

2008/0130585 A1   6/2008  Park et al.
2016/0219088 A1   7/2016  Ma et al.
(Continued)

FOREIGN PATENT DOCUMENTS

| CN | 101541099 A | 9/2009 |
| CN | 105636098 A | 6/2016 |
| WO | 2014059572 A1 | 4/2014 |

OTHER PUBLICATIONS

WO_2018086064_A1_I (Year: 2016).*
(Continued)

*Primary Examiner* — Rushil Parimal Sampat
(74) *Attorney, Agent, or Firm* — Fish & Richardson P.C.

(57) ABSTRACT

Example data sending methods and apparatus are described. One example method includes sending a first message to a network device by a terminal device. The first message is used to indicate information about remaining time of each of one or more data packets. The remaining time of each of the one or more data packets is used to indicate that the terminal device needs to finish sending each of the one or more data packets before the end of the remaining time. The terminal device obtains information about a resource configured by the network device for the terminal device, wherein the resource is used to send each of the one or more data packets before the end of the remaining time.

20 Claims, 4 Drawing Sheets

(51) Int. Cl.
*H04W 72/12* (2009.01)
*H04W 80/02* (2009.01)
*H04W 72/0446* (2023.01)
*H04W 72/1268* (2023.01)

(52) U.S. Cl.
CPC .................. *H04W 72/0446* (2013.01); *H04W 72/1268* (2013.01); *H04W 80/02* (2013.01)

(58) Field of Classification Search
CPC ............. H04W 80/02; H04W 72/1289; H04W 72/1278; H04W 72/042; H04W 72/044; H04W 72/1257; H04W 72/1284
See application file for complete search history.

(56) References Cited

U.S. PATENT DOCUMENTS

| | | | |
|---|---|---|---|
| 2018/0042042 A1 | 2/2018 | Li et al. | |
| 2018/0343666 A1* | 11/2018 | Feng | ...................... H04W 72/14 |
| 2019/0098542 A1* | 3/2019 | Tang | ................. H04W 56/0065 |
| 2019/0268886 A1* | 8/2019 | Tang | .................... H04W 72/042 |
| 2019/0289620 A1* | 9/2019 | Zhang | ................ H04W 72/1242 |
| 2021/0176790 A1* | 6/2021 | Tang | ...................... H04W 36/22 |

OTHER PUBLICATIONS

WO_2017088123_A1_I (Year: 2015).*
WO 2019/100343 A1 (Year: 2019).*
WO 2017/193307 A1 (Year: 2016).*
3GPP TR 38.801 V14.0.0 (Mar. 2017),3rd Generation Partnership Project,Technical Specification Group Radio Access Network,Study on new radio access technology, Radio access architecture and interfaces(Release 14), 91 pages.
PCT International Search Report and Written Opinion in International Application No. PCT/CN2019/073,634, dated Mar. 29, 2019, 15 pages (With English Translation).
Office Action issued in Chinese Application No. 201810152214.9 dated Dec. 22, 2020, 7 pages.
Extended European Search Report issued in European Application No. 19754584.1 dated Dec. 11, 2020, 9 pages.
Intel Corporation, "Enhancement of SR/BSR," 3GPP TSG RAN WG2 Meeting # 98, R2-1704784, Hangzhou, China, May 15-19, 2017, 5 pages.

* cited by examiner

SCHEDULING RADIO RESOURCES USING FIRST AND SECOND CONFIGURATION

CROSS-REFERENCE TO RELATED APPLICATIONS

This application is a continuation of International Application No. PCT/CN2019/073634, filed on Jan. 29, 2019, which claims priority to Chinese Patent Application No. 201810152214.9, filed on Feb. 14, 2018. The disclosures of the aforementioned applications are hereby incorporated by reference in their entireties.

TECHNICAL FIELD

This application relates to the communications field, and more specifically, to a data sending method and a communications device.

BACKGROUND

A long term evolution (LTE) system provides an uplink scheduling request (SR) mechanism. A terminal notifies, through an SR, a base station that an uplink resource is required to perform uplink shared channel transmission. The terminal needs to report, through a buffer status report (BSR), a data volume that needs to be sent. After receiving the SR, the base station allocates an uplink resource to the terminal, where the allocated uplink resource is at least sufficient for the terminal to send the BSR.

As mobile internet technologies develop, various services are emerging. For an ultra-reliable and low-latency communication (URLLC) service, such as telemedicine or industrial control, its high reliability and low latency requirements need to be met. High reliability refers to a high probability of transmitting an error-free data packet through a communications system within a specific latency range. One performance counter of the high reliability is a proportion of error-free data packets that are successfully transmitted within the specific latency range in all data packets.

In existing SR and BSR mechanisms, information reported by a terminal device to a base station through an SR/a BSR can indicate only existence of data to be sent in an uplink buffer of the terminal device or a volume of the data, and the base station cannot allocate an uplink resource for an urgent data packet in the buffer of the UE in a timely manner. Therefore, the existing SR and BSR mechanisms cannot meet the high reliability and low latency requirements, and cannot ensure service data transmission that requires high reliability and low latency. Therefore, a new solution urgently needs to be proposed to meet the high reliability and low latency requirements.

SUMMARY

This application provides a data sending method and a communications device. Information about remaining time of a data packet is reported to a network device, so that the network device can allocate a resource to a terminal device in a timely manner. This meets a requirement that the terminal device needs to send an urgent data packet or an urgent service in a timely manner.

According to a first aspect, a data sending method is provided. The method includes:

sending, by a terminal device, a first message to a network device, where the first message is used to indicate information about remaining time of each of one or more data packets, and the remaining time of each of the one or more data packets is used to indicate that the terminal device needs to finish sending each of the one or more data packets before the end of the remaining time; and obtaining, by the terminal device, information about a resource configured by the network device for the terminal device, where the resource is used to send each of the one or more data packets before the end of the remaining time.

In this embodiment of this application, the terminal device sends the first message to the network device, where the first message is used to indicate the information about the remaining time of each of the one or more data packets, and the remaining time of each of the one or more data packets is used to indicate that the terminal device needs to finish sending each of the one or more data packets before the end of the remaining time. Then the network device can allocate the resource to the terminal device in a timely manner. This meets a requirement that the terminal device needs to send an urgent data packet or an urgent service in a timely manner, and helps improve reliability of an ultra-reliable and low-latency communication service.

Optionally, the information about the remaining time may indicate one specific moment, or may indicate one time period. When the information about the remaining time is a specific moment, the data packet may be a data packet with shortest remaining time in a plurality of data packets. When the information about the remaining time is a specific time period, the data packets may be one or more data packets whose respective remaining time falls within the specific time period.

Optionally, the information about the remaining time may be absolute time information in a unit of a time domain unit (for example, a symbol, slot, or millisecond ms), or may be a subframe number of a subframe in which a data packet expires, or may be a time index value.

In a possible implementation, the first message is a first scheduling request. The method further includes:

determining, by the terminal device, a configuration of the first scheduling request based on a first correspondence and the remaining time, where the first correspondence is a correspondence between a configuration of a scheduling request and the remaining time of each of the one or more data packets, and the configuration of the first scheduling request includes a resource position occupied by the first scheduling request.

Sending, by a terminal device, a first message to a network device includes:

sending, by the terminal device, the first scheduling request to the network device by using the configuration of the first scheduling request.

Therefore, the terminal device sends a scheduling request to the network device, so that the network device can determine remaining time of a data packet based on a configuration, of the scheduling request used by the terminal device to send the scheduling request, to schedule a resource for the terminal device in a timely manner.

In a possible implementation, the first message is further used to indicate information about a total data volume corresponding to the one or more data packets whose respective remaining time meets a preset time threshold, and the first message is a second scheduling request. The method further includes:

determining, by the terminal device, a configuration of the second scheduling request based on a second correspondence and the information about the total data volume, where the second correspondence is a correspondence between a configuration of a scheduling request and the total data volume of the one or more data packets, and the configuration of the second scheduling request includes a resource position occupied by the second scheduling request.

Sending, by a terminal device, a first message to a network device includes:

sending, by the terminal device, the second scheduling request to the network device by using the configuration of the second scheduling request.

Therefore, the terminal device sends a scheduling request to the network device, so that the network device can determine a data volume of a data packet based on a configuration, of the scheduling request used by the terminal device to send the scheduling request, to schedule a resource for the terminal device in a timely manner.

In a possible implementation, the first message is a buffer status report. The method further includes:

triggering, by the terminal device, the buffer status report based on one or more of the following conditions (1) to (3):

(1) the remaining time of each of the one or more data packets is less than or equal to a preset time threshold;

(2) the remaining time of each of the one or more data packets is less than or equal to a preset time threshold, and a total data volume of the one or more data packets is greater than or equal to a preset data volume threshold; or (3) the remaining time of each of the one or more data packets is less than or equal to a preset time threshold, and a proportion of a total data volume of the one or more data packets in a total volume of to-be-sent data on a logical channel on which the one or more data packets are located is greater than or equal to a proportion threshold.

Sending, by a terminal device, a first message to a network device includes:

sending, by the terminal device, the buffer status report to the network device.

Therefore, the terminal device triggers the buffer status report, and sends the triggered buffer status report to the network device, so that the network device can allocate the resource to the terminal device based on the buffer status report.

In a possible implementation, the first message is a buffer status report. Sending, by a terminal device, a first message to a network device includes:

sending, by the terminal device, the buffer status report to the network device, where the buffer status report includes the information about the remaining time of each of the one or more data packets.

Therefore, the terminal device sends the buffer status report to the network device, so that the network device can learn of the information about the remaining time of the data packet based on content carried in the buffer status report, to schedule the resource for the terminal device in a timely manner.

In a possible implementation, the buffer status report further includes information about a data volume or data volumes of the one or more data packets, with remaining time within different time periods, on a logical channel on which the one or more data packets are located.

In a possible implementation, the first message is a buffer status report. The method further includes:

determining, by the terminal device, a first coding scheme based on a third correspondence and the remaining time, where the third correspondence is a correspondence between a coding scheme of a buffer status report and remaining time of a data packet.

Sending, by a terminal device, a first message to a network device includes:

sending, by the terminal device to the network device, the buffer status report encoded by using the first coding scheme.

Therefore, the terminal device implicitly indicates the remaining time of the data packet through the used coding scheme, so that the network device can determine, based on the coding scheme, whether a resource needs to be configured for the terminal device.

In a possible implementation, when the network device configures a periodic resource for the terminal device, the first message is a medium access control control element MAC CE, and the remaining time of each of the one or more data packets is remaining time of a data packet that expires before a resource in a next periodicity arrives.

Sending, by a terminal device, a first message to a network device includes:

sending, by the terminal device, the MAC CE to the network device, where the MAC CE includes the information about the remaining time of each of the one or more data packets.

Therefore, when the network device configures the periodic resource for the terminal device, before the resource in the next periodicity arrives, the terminal device sends the information about the remaining time of the data packet to the network device through the MAC CE, so that the network device can determine, based on specific content carried in the MAC CE, whether a resource needs to be configured for the terminal device.

In a possible implementation, the terminal device obtains a resource dynamically scheduled by the network device for the terminal device before the resource in the next periodicity arrives.

In a possible implementation, the MAC CE is further used to indicate information about a total data volume corresponding to the one or more data packets whose respective remaining time meets a preset time threshold before the resource in the next periodicity arrives.

In a possible implementation, the information about the total data volume corresponding to the one or more data packets includes a data index, and the method further includes:

determining, by the terminal device, the data index based on a fourth correspondence and the total data volume corresponding to the one or more data packets, where the fourth correspondence is a correspondence between a data index and a data volume range within which the total data volume corresponding to the one or more data packets falls.

Therefore, the terminal device may report the total data volume of the one or more data packets to the network device, so that the network device can allocate the resource to the terminal device with reference to the total data volume.

According to a second aspect, a data sending method is provided. The method includes:

receiving, by a network device, a first message sent by a terminal device, where the first message is used to indicate information about remaining time of each of one or more data packets, and the remaining time is remaining time for finishing sending each of the one or more data packets; and configuring, by the network device, a resource for the terminal device based on the information about the remaining time, where a time domain position of the resource is before the end of the remaining time.

In this embodiment of this application, the network device receives the first message sent by the terminal device, where the first message is used to indicate the information about the remaining time of each of the one or more data packets, and the remaining time of each of the one or more data packets is used to indicate that the terminal device needs to finish sending each of the one or more data packets before the end of the remaining time. Then the network device can allocate the resource to the terminal device in a timely manner. This meets a requirement that the terminal device needs to send an urgent data packet or an urgent service in a timely manner, and helps improve reliability of an ultra-reliable and low-latency communication service.

Optionally, the information about the remaining time may indicate one specific moment, or may indicate one time period. When the information about the remaining time is a specific moment, the data packet may be a data packet with shortest remaining time in a plurality of data packets. When the information about the remaining time is a specific time period, the data packets may be one or more data packets whose respective remaining time falls within the specific time period.

Optionally, the information about the remaining time may be absolute time information in a unit of a time domain unit (for example, a symbol, slot, or millisecond ms), or may be a subframe number of a subframe in which a data packet expires, or may be a time index value.

In a possible implementation, the first message is a first scheduling request. Receiving, by a network device, a first message sent by a terminal device includes:

receiving, by the network device at a first resource position, the first scheduling request sent by the terminal device.

The method further includes:

determining, by the network device, the information about the remaining time of each of the one or more data packets based on a first correspondence and the first resource position, where the first correspondence is a correspondence between a configuration of a scheduling request and the remaining time of each of the one or more data packets, and a configuration of the first scheduling request includes a resource position occupied by the first scheduling request.

Therefore, the network device may determine the remaining time of the data packet based on the configuration, of the scheduling request used by the terminal device to send the scheduling request, to schedule the resource for the terminal device in a timely manner.

In a possible implementation, the first message is further used to indicate information about a total data volume corresponding to the one or more data packets whose respective remaining time meets a preset time threshold, and the first message is a second scheduling request. Receiving, by a network device, a first message sent by a terminal device includes:

receiving, by the network device at a second resource position, the second scheduling request sent by the terminal device.

The method further includes:

determining, by the network device, the total data volume of the one or more data packets based on the second correspondence and the second resource position, where the second correspondence is a correspondence between a configuration of a scheduling request and the total data volume of the one or more data packets, and a configuration of the second scheduling request includes a resource position occupied by the second scheduling request.

Configuring, by the network device, a resource for the terminal device based on the information about the remaining time includes:

configuring, by the network device, the resource for the terminal device based on the total data volume of the one or more data packets and the remaining time.

Therefore, the network device may determine the data volume of the data packet based on the configuration, of the scheduling request used by the terminal device to send the scheduling request, to schedule the resource for the terminal device in a timely manner.

In a possible implementation, the first message is a buffer status report. Receiving, by a network device, a first message sent by a terminal device includes:

receiving, by the network device, the buffer status report sent by the terminal device, where the buffer status report includes the information about the remaining time of each of the one or more data packets.

Therefore, the network device receives the buffer status report sent by the terminal device, and allocates the resource to the terminal device based on the information, about the remaining time, carried in the buffer status report.

In a possible implementation, the buffer status report further includes information about a data volume or data volumes of the one or more data packets, with remaining time within different time periods, on a logical channel on which the one or more data packets are located.

Therefore, the network device may learn of the information about the data volume of the data packet based on the buffer status report to schedule the resource for the terminal device in a timely manner.

In a possible implementation, the first message is a buffer status report. Receiving, by a network device, a first message sent by a terminal device includes:

receiving, by the network device, the buffer status report sent by the terminal device.

The method further includes:

determining, by the network device, the remaining time based on a coding scheme corresponding to the buffer status report and a third correspondence, where the third correspondence is a correspondence between a coding scheme of a buffer status report and the remaining time of each of the one or more data packets.

Therefore, the network device obtains the remaining time of the data packet based on the coding scheme, and then allocates the resource to the terminal device.

In a possible implementation, when the network device configures a periodic resource for the terminal device, the first message is a medium access control control element MAC CE, and the remaining time of each of the one or more data packets is remaining time of a data packet that expires before a resource in a next periodicity arrives.

Receiving, by a network device, a first message sent by a terminal device includes:

receiving, by the network device, the MAC CE sent by the terminal device, where the MAC CE includes the information about the remaining time of each of the one or more data packets.

Therefore, the network device may determine, based on specific content carried in the MAC CE, whether a resource needs to be configured for the terminal device.

In a possible implementation, configuring, by the network device, a resource for the terminal device based on the information about the remaining time includes:

configuring, by the network device, the resource for the terminal device before the resource in the next periodicity arrives.

In a possible implementation, the MAC CE is further used to indicate information about a total data volume corresponding to the one or more data packets whose respective remaining time meets a preset time threshold before the resource in the next periodicity arrives.

Therefore, the network device obtains the information about the data volume of the data packet based on the MAC CE, and allocates the resource to the terminal device with reference to the information about the data volume.

In a possible implementation, the information about the total data volume corresponding to the one or more data packets includes a data index, and the method further includes:

determining, by the network device based on a fourth correspondence and the data index, the total data volume corresponding to the one or more data packets, where the fourth correspondence is a correspondence between a data index and a data volume range within which the total data volume corresponding to the one or more data packets falls.

Therefore, the network device may obtain the total data volume of the one or more data packets based on the index, to allocate the resource to the terminal device with reference to the total data volume.

According to a third aspect, a communications apparatus is provided. The communications apparatus is a terminal device, or may be a chip or a circuit, and is configured to perform the method according to the first aspect or any possible implementation of the first aspect. Specifically, the communications apparatus may be implemented by hardware, or may be implemented by hardware executing corresponding software.

In some possible implementations, the communications apparatus includes modules configured to perform the method according to the first aspect or any possible implementation of the first aspect.

In some possible implementations, the communications apparatus includes a processor and a memory. The memory is configured to store an instruction. When the communications apparatus runs, the processor executes the instruction stored in the memory, so that the communications apparatus performs the communication method according to the first aspect or any implementation of the first aspect. It should be noted that the memory may be integrated into the processor, or may be independent of the processor.

In some possible implementations, the communications apparatus includes a processor. The processor is configured to be coupled to a memory, read an instruction in the memory, and perform, based on the instruction, the data sending method according to the first aspect or any implementation of the first aspect.

According to a fourth aspect, a communications apparatus is provided. The communications apparatus is a network device, or may be a chip or a circuit, and is configured to perform the method according to the second aspect or any possible implementation of the second aspect. Specifically, the communications apparatus may be implemented by hardware, or may be implemented by hardware executing corresponding software.

In some possible implementations, the communications apparatus includes modules configured to perform the method according to the second aspect or any possible implementation of the second aspect.

In some possible implementations, the communications apparatus includes a processor and a memory. The memory is configured to store an instruction. When the communications apparatus runs, the processor executes the instruction stored in the memory, so that the communications apparatus performs the communication method according to the second aspect or any implementation of the second aspect. It should be noted that the memory may be integrated into the processor or may be independent of the processor.

In some possible implementations, the communications apparatus includes a processor. The processor is configured to be coupled to a memory, read an instruction in the memory, and perform, based on the instruction, the data sending method according to the second aspect or any implementation of the second aspect.

According to a fifth aspect, a terminal device is provided. The terminal device includes a processor, a memory, and a transceiver. The processor is connected to the memory and the transceiver. The memory is configured to store an instruction; the processor is configured to execute the instruction; and the transceiver is configured to communicate with another network element under control of the processor. When the processor executes the instruction stored in the memory, the execution enables the processor to perform the method according to the first aspect or any possible implementation of the first aspect.

According to a sixth aspect, a network device is provided. The network device includes a processor, a memory, and a transceiver. The processor is connected to the memory and the transceiver. The memory is configured to store an instruction; the processor is configured to execute the instruction; and the transceiver is configured to communicate with another network element under control of the processor. When the processor executes the instruction stored in the memory, the execution enables the processor to perform the method according to the second aspect or any possible implementation of the second aspect.

According to a seventh aspect, a computer-readable storage medium is provided. The computer-readable storage medium stores a program. The program enables a communications apparatus to perform the data sending method according to any one of the foregoing aspects or the implementations of the foregoing aspects.

According to an eighth aspect, this application further provides a computer program product including an instruction. When the computer program product runs on a computer, the computer is enabled to perform the data sending method according to any one of the foregoing aspects.

According to a ninth aspect, this application further provides a system. The system includes a terminal device. The terminal device may be configured to perform the steps performed by the terminal device in the first aspect and any method of the first aspect.

In some possible implementations, the system may further include a network device. The network device may be configured to perform the steps performed by the network device in the second aspect and any method in the second aspect.

In some possible implementations, the system may further include another device that interacts with the terminal device and/or network device in the embodiments of this application, and the like.

According to a tenth aspect, a chip system is provided. The chip system includes a memory and a processor. The memory is configured to store a computer program. The processor is configured to invoke the computer program from the memory and run the computer program, so that a communications device on which the chip system is installed performs the method according to any one of the foregoing aspects and the possible implementations thereof.

DESCRIPTION OF EMBODIMENTS

The following describes technical solutions of this application with reference to accompanying drawings.

In the embodiments of this application, "a plurality of" may be understood as "at least two"; and "a plurality of items" may be understood as "at least two items".

The technical solutions in the embodiments of this application may be applied to various communications systems, for example, a global system for mobile communications (GSM) system, a code division multiple access (CDMA) system, a wideband code division multiple access (WCDMA) system, a communications system based on an orthogonal frequency division multiplexing (OFDM) technology, a general packet radio service (GPRS), a long term evolution (LTE) system, an LTE frequency division duplex (FDD) system, an LTE time division duplex (TDD) system, a universal mobile telecommunications system (UMTS), a wireless fidelity (WiFi) system, a worldwide interoperability for microwave access (WiMAX) communications system, a wireless local area network (WLAN) system, a public land mobile network (PLMN) network, a vehicle-to-everything (V2X) system, a future 5th generation (5G) system, or a new radio (NR) system.

Figure 1:
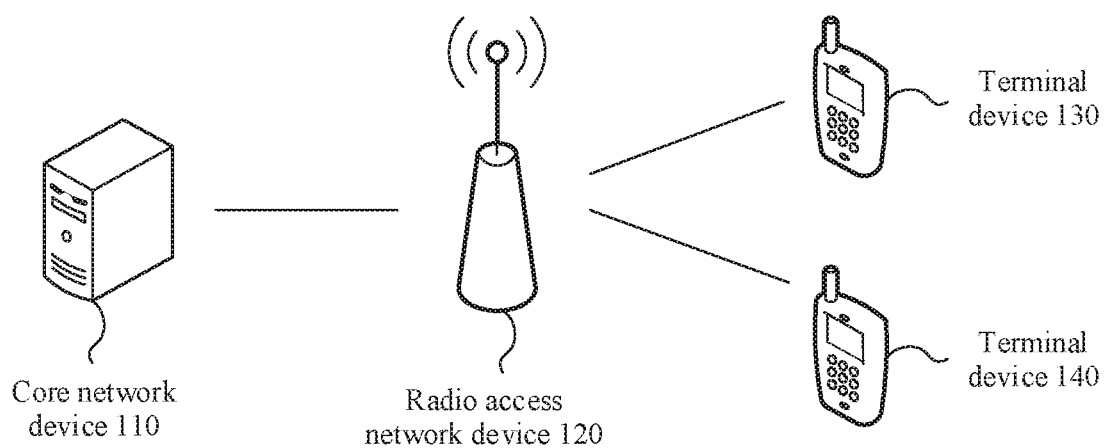
FIG. 1 is a schematic diagram of an architecture of a mobile communications system to which an embodiment of this application is applied.

FIG. 1 is a schematic diagram of an architecture of a mobile communications system to which an embodiment of this application is applied. As shown in FIG. 1, the mobile communications system includes a core network device 110, a radio access network device 120, and at least one terminal device (for example, a terminal device 130 and a terminal device 140 in FIG. 1). The terminal device 130, 140 is connected to the radio access network device 120 in a wireless manner, and the radio access network device 120 is connected to the core network device 110 in a wireless or wired manner. The core network device 110 and the radio access network device 120 may be different physical devices independent of each other, or a function of the core network device 110 and a logical function of the radio access network device 120 may be integrated into one physical device, or a part of a function of the core network device 110 and a part of a function of the radio access network device 120 may be integrated into one physical device. The terminal device 130, 140 may be located at a fixed location, or may be mobile. It should be understood that FIG. 1 is merely a schematic diagram, and the communications system may further include another network device, for example, may further include a wireless relay device and a wireless backhaul device (not shown in FIG. 1). Quantities of core network devices, radio access network devices, and terminal devices included in the mobile communications system are not limited in the embodiments of this application.

The radio access network device is an access device or a network device that connects the terminal device to the mobile communications system in a wireless manner, and may be a base station NodeB, an evolved NodeB eNodeB, a gNodeB gNB in a 5G mobile communications system, a base station in a future mobile communications system, an access node in a WiFi system, a radio controller in a cloud radio access network (CRAN) scenario, a relay station, an access point, a vehicle-mounted device, a wearable device, a network device on a future 5G network, a network device on a future evolved PLMN network, or the like. A specific technology and a specific device form that are used by the radio access network device are not limited in the embodiments of this application.

The terminal device may also be referred to as a terminal, user equipment (UE), a mobile station (MS), a mobile terminal (MT), or the like. The terminal device may be a mobile phone, a tablet (Pad), a computer having a wireless transceiver function, a virtual reality (VR) terminal device, an augmented reality (AR) terminal device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, a station (ST) on a WLAN, or the like.

For example, the core network device includes a mobility management entity (MME) or a broadcast multicast service center (BMSC), or may include a corresponding function entity in a 5G system, for example, a core network control plane (CP) or user plane (UP) network function such as a session management network function (session management NF, SMF) or an access and mobility management function (AMF). The core network control plane may also be understood as a core network control plane function (CPF) entity.

The radio access network device and the terminal device may be deployed on land, including an indoor or outdoor device, a handheld device, or a vehicle-mounted device; or may be deployed on the water; or may be deployed on an airplane, a balloon, and a satellite in the air. Application scenarios of the radio access network device and the terminal device are not limited in the embodiments of this application.

The embodiments of this application may be applied to downlink signal transmission, or may be applied to uplink signal transmission, or may be applied to device-to-device (D2D) signal transmission. For the downlink signal transmission, a sending device is the radio access network device, and a corresponding receiving device is the terminal device. For the uplink signal transmission, a sending device is the terminal device, and a corresponding receiving device is the radio access network device. For the D2D signal transmission, a sending device is a terminal device, and a corresponding receiving device is also a terminal device. A signal transmission direction is not limited in the embodiments of this application.

Communication between the radio access network device and the terminal device and communication between terminal devices may be performed by using a licensed spectrum, an unlicensed spectrum, or both a licensed spectrum and an unlicensed spectrum. The communication between the radio access network device and the terminal device and the communication between the terminal devices may be performed by using a frequency spectrum below 6 gigahertz (GHz), a frequency spectrum above 6 GHz, or both a frequency spectrum below 6 GHz and a frequency spectrum above 6 GHz. A spectrum resource used between the radio access network device and the terminal device is not limited in the embodiments of this application.

A method and an apparatus that are provided in the embodiments of this application may be applied to a terminal device or a network device. The terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant messaging software. In addition, a specific structure of an entity for performing a data sending method is not specially limited in the embodiments of this application, provided that the entity can run a program recording code of the data sending method in the embodiments of this application to perform communication based on the data sending method in the embodiments of this application. For example, the data sending method in the embodiments of this application may be performed by a terminal device or a network device, or a functional module that is in a terminal device or a network device and that can invoke a program and execute the program.

In addition, aspects or features in the embodiments of this application may be implemented as a method, an apparatus, or a product that uses standard programming and/or engineering technologies. The term "product" used in the embodiments of this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD), a digital versatile disc (DVD), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

In LTE, a terminal device notifies, through a scheduling request (SR), a network device that an uplink resource is or is not required to perform uplink shared channel (UL-SCH) transmission. After receiving the SR, the network device allocates an uplink resource to the terminal device. The terminal device needs to report, through a buffer status report (BSR), a data volume that is in a buffer and that needs to be sent. Information reported by the terminal device to the network device through the SR/BSR can indicate only existence of data to be sent in an uplink buffer of the terminal device or a volume of the data, but cannot indicate information about remaining time of each to-be-sent data packet. To be specific, the network device cannot determine, based on the information reported by the terminal device, whether there is an urgent data packet (namely, a data packet with relatively short remaining time before an upper limit of a latency range arrives) in the data in the buffer of the terminal device. Therefore, the network device cannot allocate an uplink resource for an urgent data packet in the buffer of the UE in a timely manner, so that the data packet is not successfully transmitted within the latency range. In other words, when the terminal device needs to report the urgent data packet, the information about the remaining time of the data in the uplink buffer cannot be reported to the network device in the technical solution in the prior art. Consequently, the network device cannot allocate the uplink resource for the urgent data packet in the buffer of the terminal device in a timely manner, so that the urgent data packet cannot be successfully transmitted within a required time range.

The following describes a data sending method in the embodiments of this application in detail with reference to FIG. 2 to FIG. 9.

Figure 2:
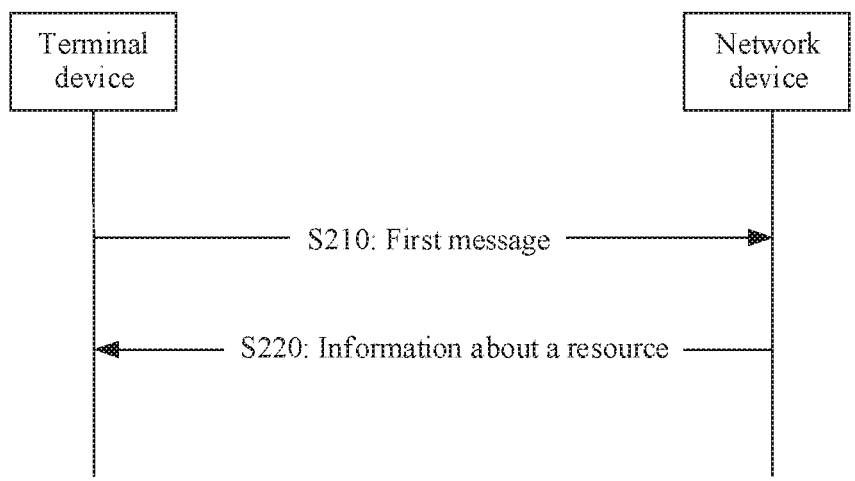
FIG. 2 is a schematic interaction diagram of a data sending method according to an embodiment of this application.

FIG. 2 is a schematic interaction diagram of a data sending method 200 according to an embodiment of this application. For example, in the method 200, a terminal device may be the terminal device in FIG. 1 (for example, the terminal device 130 or the terminal device 140 in FIG. 1), and a network device may be the radio access network device 120 in FIG. 1. As shown in FIG. 2, the method 200 includes the following steps.

S210: A terminal device sends a first message to a network device, where the first message is used to indicate information about remaining time of each of one or more data packets, and the remaining time of each of the one or more data packets is used to indicate that the terminal device needs to finish sending each of the one or more data packets before the end of the remaining time. Correspondingly, the network device receives the first message. Each data packet has corresponding remaining time.

Optionally, the remaining time of each of the one or more data packets may be determined based on a requirement of a service (for example, a URLLC service) or urgency of a service.

Optionally, the information about the remaining time may indicate one specific moment. If the first message indicates that the remaining time meets a preset time threshold, there may be a plurality of data packets. Specifically, that the remaining time meets the preset time threshold means that the remaining time is less than or equal to the preset time threshold, or that the remaining time is greater than or equal to the preset time threshold, or that the remaining time falls within a preset time period. The preset time threshold may be configured by the network device for the terminal device through a system message or dedicated RRC signaling, or may be predefined in a protocol. This is not limited in this embodiment of this application. In this case, the data packet may be a data packet with shortest remaining time in the plurality of data packets. The remaining time of the data packet may be obtained from a data packet discard timer associated, at a packet data convergence protocol (PDCP) layer, with a PDCP service data unit SDU) corresponding to the data packet. For example, the remaining time of the data packet is a period of time that remains before the discard timer associated with the PDCP SDU corresponding to the data packet expires. Optionally, the remaining time of the data packet may alternatively be obtained from a timer associated, at an RLC laver, with a radio link layer control (RLC) protocol SDU/protocol data unit (PDU) corresponding to the data packet. For example, the remaining time of the data packet is a period of time that remains before the timer associated, at the RLC layer, with the RLC SDU/PDU corresponding to the data packet expires. A manner of obtaining the remaining time of the data packet is not limited in this embodiment of this application.

Optionally, the information about the remaining time may alternatively indicate one time period. In this case, there may be a plurality of data packets, and remaining time of each of the plurality of data packets falls within the time period indicated by the information about the remaining time. The remaining time of each of the plurality of data packets is used to indicate that the terminal device needs to finish sending each of the plurality of data packets before the end of the time period. It should be noted that each data packet has its own remaining time. If the information about the remaining time indicates one time period or the remaining time is compared with one preset time threshold, there may be a plurality of data packets. In this case, information about remaining time of each of the plurality of data packets is remaining time corresponding to a data packet with shortest remaining time in the plurality of data packets.

Optionally, the information about the remaining time may be absolute time information in a unit of a time domain unit (for example, a symbol, slot, or millisecond ms), or may be a subframe number of a subframe in which a data packet expires, or may be a time index value. This is not limited in this embodiment of this application.

Further, the first message may be not only used to indicate the information about the remaining time of the data packet, but also used to indicate information about a data volume corresponding to the data packet. Specifically, if the information about the remaining time of the data packet is one specific moment, the first message may be further used to indicate a data volume corresponding to the data packet with the shortest remaining time. If the information about the remaining time of the data packet is one specific time period, the first message may be further used to indicate a total data volume corresponding to a plurality of data packets that need to be reported within the time period.

In this embodiment of this application, the first message may indicate specific content in a plurality of manners. For example, the first message may directly carry the specific indicated content, or the first message may indirectly indicate the specific content. This is not limited in this embodiment of this application.

Optionally, the first message may be an SR a BSR, or a medium access control control element (MAC CE). For example, the terminal device may directly include the information about the remaining time of the data packet in the BSR or the MAC CE. For another example, the terminal device may indirectly indicate the remaining time of the data packet to the network device by using a configuration, of the scheduling request used to send the SR, a coding scheme used to send the BSR, or the like. This is not limited in this embodiment of this application.

Correspondingly, after receiving the first message from the terminal device, the network device may obtain the remaining time of the data packet based on the first message. For example, if the first message includes the remaining time of the data packet, the network device may directly obtain the remaining time of the data packet. If the first message indirectly indicates the remaining time of the data packet, the network device may determine the remaining time of the data packet according to an indirect indication rule or based on a correspondence. This is not limited in this embodiment of this application.

S220: The network device configures a resource for the terminal device based on the information about the remaining time, where a time domain position of the resource is before the end of the remaining time. Correspondingly, the terminal device obtains information about the resource configured by the network device. For the terminal device, the resource is used by the terminal device to send each of the one or more data packets before the end of the remaining time.

Herein, after obtaining the information about the remaining time of each of the one or more data packets, the network device schedules or configures an uplink resource for the terminal device based on the information about the remaining time of each of the one or more data packets. The terminal device sends each of the one or more data packets before the end of the remaining time by using the uplink resource configured by the network device, so that the terminal device can send the data packet in a timely manner.

In a prior-art solution, the terminal device does not report the remaining time of the data packet to the network device. However, in the data sending method in this embodiment of this application, the terminal device sends the first message to the network device, where the first message is used to indicate the information about the remaining time of each of the one or more data packets, and the remaining time of each of the one or more data packets is used to indicate that the terminal device needs to finish sending each of the one or more data packets before the end of the remaining time. Then the network device can allocate the resource to the terminal device in a timely manner. This meets a requirement that the terminal device needs to send an urgent data packet or an urgent service in a timely manner, and helps improve reliability of an ultra-reliable and low-latency communication service.

The following further describes in detail an indication manner and/or a representation form of the first message.

In a first optional implementation, the first message is a first scheduling request. The method 200 further includes:

determining, by the terminal device, a configuration of the first scheduling request based on a first correspondence and the remaining time, where the first correspondence is a correspondence between a configuration of a scheduling request and the remaining time of each of the one or more data packets, and the configuration of the first scheduling request includes a resource position occupied by the first scheduling request.

S210 includes:

sending, by the terminal device, the first scheduling request to the network device by using the configuration of the first scheduling request.

It should be noted that the first correspondence may be configured by the network device for the terminal device through a system message or dedicated RRC signaling, or may be predefined in a protocol. This is not limited in this embodiment of this application. In other words, both the terminal device and the network device may learn of the first correspondence. Specifically, the network device configures a plurality of configurations of scheduling requests for each logical channel (LCH) of the terminal device. There is a correspondence or a mapping relationship between each configuration of a scheduling request and remaining time of each of one or more to-be-sent data packets on the logical channel. The first correspondence may be a mapping relationship between a level of remaining time of a most urgent data packet and a configuration, of a scheduling request, that needs to be used by the terminal device.

Optionally, the network device may configure a plurality of configurations of scheduling requests for each terminal device. In this case, the first correspondence may be a correspondence between each configuration of a scheduling request and remaining time of each of one or more to-be-sent data packets in an uplink buffer (namely, to-be-sent data packets on all LCHs) of the terminal device. In this case, when sending a scheduling request, the terminal device needs to consider the remaining time of each data packet in the uplink buffer of the terminal device. For example, if the terminal device needs to finish sending one or more data packets in the to-be-sent data packets in the uplink buffer of the terminal device before the end of respective remaining time, the terminal device sends a scheduling request to the network device by using a corresponding configuration of the scheduling request.

It should be understood that regardless of whether the terminal device sends a scheduling request for remaining time of each of one or more data packets on an LCH or the remaining time of each of the one or more to-be-sent data packets on all LCHs, the terminal device may use the first correspondence to search for a configuration of the scheduling request. This is not limited in this embodiment of this application.

Figure 3:
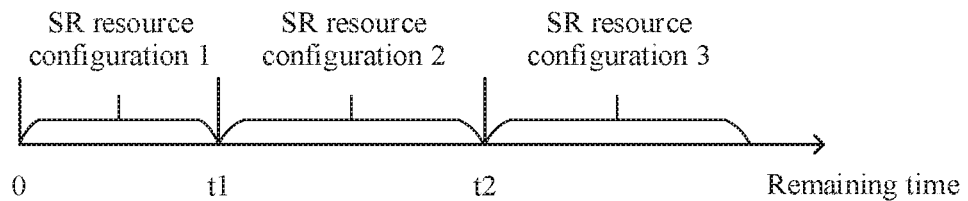
FIG. 3 is a schematic diagram of an example of a first correspondence according to an embodiment of this application.

FIG. 3 is a schematic diagram of an example of a first correspondence according to an embodiment of this application. As shown in FIG. 3, if remaining time of a data packet falls within a time period 0-t1, the terminal device sends an SR request to the network device by using an SR resource configuration 1; or if remaining time of a data packet falls within a time period t1-t2 (which may include the time endpoint t1), the terminal device sends an SR request to the network device by using an SR resource configuration 2; or if remaining time of a data packet is greater than or equal to t2, the terminal device sends an SR request to the network device by using an SR resource configuration 3.

Specifically, the terminal device searches the first correspondence for the configuration of the first scheduling request based on the remaining time of the data packet, and sends the first scheduling request to the network device by using the configuration of the first scheduling request. Optionally, the configuration of the first scheduling request may include the resource position occupied by the first scheduling request, a timer for forbidding the first scheduling request from being frequently sent, a maximum quantity of times of sending the first scheduling request, and the like. For example, the terminal device sends the first scheduling request to the network device at a first resource position.

Correspondingly, the network device receives the first scheduling request from the terminal device at the first resource position. The network device determines the information about the remaining time of each of the one or more data packets based on the first correspondence and the first resource position. In other words, the network device may search the first correspondence for the remaining time of the data packet, to configure the resource for the terminal device based on the remaining time of the data packet.

Therefore, the terminal device sends a scheduling request to the network device, so that the network device can determine remaining time of a data packet based on a configuration, of the scheduling request used by the terminal device to send the scheduling request, to schedule a resource for the terminal device in a timely manner.

In a second optional implementation, the first message is a second scheduling request, and the first message is further used to indicate information about a total data volume corresponding to the one or more data packets whose respective remaining time meets a preset time threshold. The method 200 further includes:

determining, by the terminal device, a configuration of the second scheduling request based on a second correspondence and the information about the total data volume, where the second correspondence is a correspondence between a configuration of a scheduling request and the total data volume of the one or more data packets, and the configuration of the second scheduling request includes a resource position occupied by the second scheduling request.

S210 includes:

sending, by the terminal device, the second scheduling request to the network device by using the configuration of the second scheduling request.

In this implementation, if there is the data packet whose remaining time meets the preset time threshold, the terminal device sends the second scheduling request, to notify the network device of the information about the data volume corresponding to the data packet whose remaining time meets the preset time threshold.

Herein, the remaining time of each of the one or more data packets meets the preset time threshold. For example, if the preset time threshold is T, the remaining time meets the preset time threshold means that the remaining time is less than or equal to the time T. or that the remaining time is greater than or equal to the time T.

Figure 4:
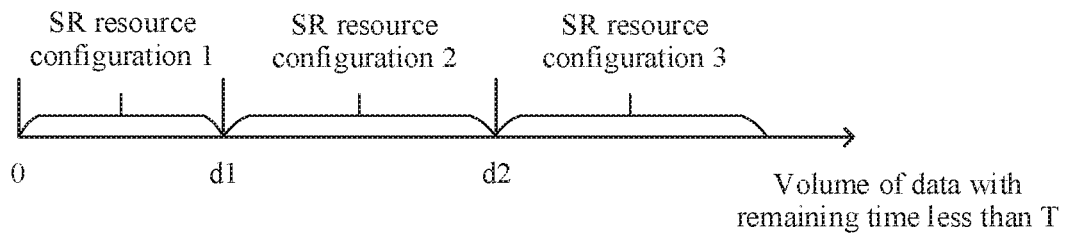
FIG. 4 is a schematic diagram of an example of a second correspondence according to an embodiment of this application.

It should be noted that the second correspondence may be configured by the network device for the terminal device through a system message or dedicated RRC signaling, or may be predefined in a protocol. This is not limited in this embodiment of this application. In other words, both the terminal device and the network device may learn of the second correspondence. Specifically, the network device configures a plurality of configurations of scheduling requests for each logical channel of the terminal device. There is a correspondence or a mapping relationship between each configuration of a scheduling request and information about a data volume of a data packet. The second correspondence may be a mapping relationship between a level of the information about the data volume corresponding to the data packet whose remaining time meets the preset time threshold and a configuration, of a scheduling request, that needs to be used by the terminal device. FIG. 4 is a schematic diagram of an example of a second correspondence according to an embodiment of this application. As shown in FIG. 4, if a data volume of a data packet falls within a data volume range 0-d1 and remaining time of the data packet is less than T, the terminal device sends an SR request to the network device by using an SR resource configuration 1; or if a data volume of a data packet falls within a data volume range d1-d2 (which may include the data volume endpoint d1) and remaining time of the data packet is less than T, the terminal device sends an SR request to the network device by using an SR resource configuration 2; or if a data volume of a data packet is greater than or equal to d2 and remaining time of the data packet is less than T, the terminal device sends an SR request to the network device by using an SR resource configuration 3.

If the remaining time of each of the one or more data packets meets the preset time threshold, the terminal device may further report, to the network device, the information about the data volume corresponding to the data packet. Specifically, the terminal device searches the second correspondence for the configuration of the second scheduling request based on the information about the data volume corresponding to the data packet, and sends the second scheduling request to the network device by using the configuration of the second scheduling request. Optionally, the configuration of the second scheduling request may include the resource position occupied by the second scheduling request, a timer for forbidding the second scheduling request from being frequently sent, a maximum quantity of times of sending the second scheduling request, and the like. For example, the terminal device sends the second scheduling request to the network device at a second resource position.

Correspondingly, the network device receives the second scheduling request from the terminal device at the second resource position. The network device determines, based on the second correspondence and the second resource position, the information about the total data volume of the one or more data packets whose respective remaining time meets the preset time threshold. In other words, the network device may search the second correspondence for the data volume of the data packet to configure the resource for the terminal device based on the data volume of the data packet.

Therefore, the terminal device sends a scheduling request to the network device, so that the network device can determine a data volume of a data packet based on a configuration, of the scheduling request used by the terminal device to send the scheduling request, to schedule a resource for the terminal device in a timely manner.

In a third optional implementation, the first message is a buffer status report. The method 200 further includes:

triggering, by the terminal device, the buffer status report based on one or more of the following conditions (1) to (3):

(1) the remaining time of each of the one or more data packets is less than or equal to a preset time threshold;

(2) the remaining time of each of the one or more data packets is less than or equal to a preset time threshold, and a total data volume of the one or more data packets is greater than or equal to a preset data volume threshold; or (3) the remaining time of each of the one or more data packets is less than or equal to a preset time threshold, and a proportion of a total data volume of the one or more data packets in a total volume of to-be-sent data on a logical channel on which the one or more data packets are located is greater than or equal to a proportion threshold, where the one or more data packets may correspond to one logical channel of the terminal device, or may correspond to different logical channels of the terminal device.

S210 includes:

sending, by the terminal device, the buffer status report to the network device. Correspondingly, the network device receives the buffer status report from the terminal device.

For example, a MAC layer of the terminal device triggers the buffer status report BSR when one or more of the following conditions are met: (1) remaining time of each of one or more data packets on one logical channel of the terminal device is less than or equal to a preset time threshold T, where the preset time threshold T may be configured by the network device for the terminal device through a system message or an RRC message, or may be predefined in a protocol, and this is not limited; (2) remaining time of each of one or more data packets on one logical channel of the terminal device is less than or equal to a preset time threshold T, and a total data volume of the one or more data packets is greater than or equal to a preset data volume threshold D, where the preset data volume threshold D and the preset time threshold T may be configured by the network device for the terminal device through a system message or an RRC message, or may be predefined in a protocol, and this is not limited; or (3) remaining time of each of one or more data packets on one logical channel of the terminal device is less than or equal to a preset time threshold T, and a proportion of a total data volume of the one or more data packets in a total volume of to-be-sent data on the logical channel is greater than or equal to a preset proportion threshold P, where the preset proportion threshold P and the preset time threshold T may be configured by the network device for the terminal device through a system message or an RRC message, or may be predefined in a protocol, and this is not limited.

It should be understood that the foregoing trigger conditions are merely an example for description, and does not constitute a limitation on the protection scope of the embodiments of this application. Definitely, a person skilled in the art may make various equivalent modifications or changes based on the foregoing trigger conditions, and such modifications or changes also fall within the scope of the embodiments of this application.

After the MAC layer of the terminal device triggers the BSR, the BSR waits at the MAC layer, that is, is in a pending state. The terminal device performs MAC PDU packet assembly only when the terminal device can perform uplink data transmission, generates a BSR MAC CE group, and sends the BSR MAC CE group to the network device in a current MAC PDU. After receiving the BSR sent by the terminal device, the network device may learn of the information about the remaining time of each of the one or more data packets and/or information about the total data volume of the one or more data packets. Herein, the BSR is triggered by the terminal device based on the remaining time of the data packet and/or the data volume of the data packet. After receiving the BSR, the network device may learn of the remaining time of the data packet and/or the data volume of the data packet. In other words, the BSR may not carry the information about the remaining time of the data packet.

In a fourth optional implementation, the first message is a buffer status report. The method 200 further includes:

sending, by the terminal device, the buffer status report to the network device, where the buffer status report includes the information about the remaining time of each of the one or more data packets. Correspondingly, the network device receives the buffer status report from the terminal device.

Figure 5:
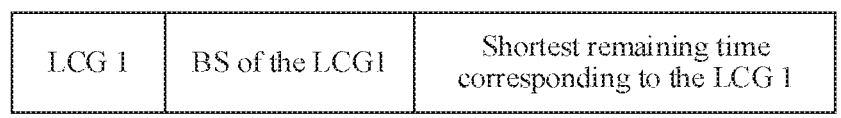
FIG. 5 is a schematic diagram of an example of a BSR format according to an embodiment of this application.

In other words, the terminal device may include the information about the remaining time of each of the one or more data packets in the BSR and send the BSR to the network device. The network device receives the BSR and obtains the information about the remaining time of each of the one or more data packets based on content carried in the BSR. Specifically, the BSR may carry information about a logical channel group, information about a data volume buffered on the logical channel group, and information about shortest remaining time in remaining time of one or more data packets on the logical channel group. FIG. 5 is used as an example. The terminal device may report buffer status (BS) information of a logical channel group (LCG) 1 to the network device by using a BSR format shown in FIG. 5. As shown in FIG. 5, a BSR MAC CE includes at least the following three fields: an ID of the LCG 1, a BS of the LCG 1, and shortest remaining time in remaining time of one or more data packets buffered in the LCG 1. The shortest remaining time in the remaining time of the one or more data packets buffered in the LCG 1 may be an absolute time value expressed in symbols, slots, or milliseconds ms, or may be a subframe number of a subframe in which a data packet with the shortest remaining time expires.

Figure 6:
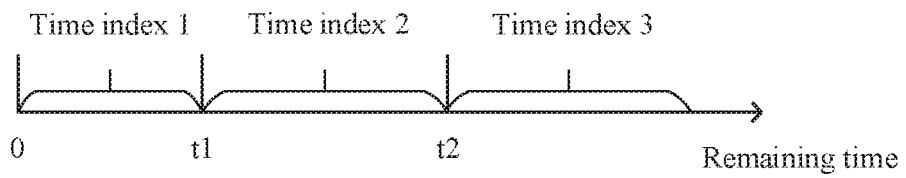
FIG. 6 is a schematic diagram of an example of a time index corresponding to remaining time according to an embodiment of this application.

Optionally, the information about the remaining time of each of the one or more data packets includes a time index corresponding to the remaining time of the data packet. In other words, the information about the remaining time of the data packet may be represented by the time index. To be specific, different levels of remaining time are obtained through division based on time indexes. FIG. 6 is a schematic diagram of an example of a time index corresponding to remaining time. For example, as shown in FIG. 6, when remaining time of each of one or more data packets falls within a time period 0-$t1$, the remaining time of each of the one or more data packets corresponds to a time index 1; or when remaining time of each of one or more data packets falls within a time period t1-t2 (which may include the time endpoint t1), the remaining time of each of the one or more data packets corresponds to a time index 2; or when remaining time of each of one or more data packets is greater than or equal to t2, the remaining time of each of the one or more data packets corresponds to a time index 3. For example, if the shortest remaining time in the remaining time of the one or more data packets corresponding to the LCG 1 falls within 0-$t1$, information, included in the BSR MAC CE, about the shortest remaining time in the remaining time of the one or more data packets buffered in the LCG 1 carries the time index 1. It should be understood that a correspondence between a time period within which remaining time falls and a time index may be configured by the network device for the terminal device through a system message or an RRC message, or may be predefined in a protocol. This is not limited.

Figure 7:
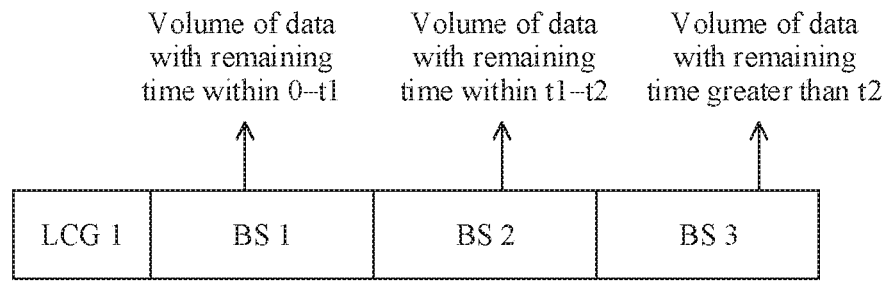
FIG. 7 is a schematic diagram of another example of a BSR format according to an embodiment of this application.

Optionally, the buffer status report may further include information about a data volume or data volumes of the one or more data packets, with remaining time within different time periods, on a logical channel on which the one or more data packets are located. In other words, the terminal device may notify the network device of the information about the data volume or data volumes of the data packets (there may be one or more data packets) with the remaining time within different time periods, so that the network device can prepare for resource scheduling. Optionally, the buffer status report may include not only a total data volume of one or more data packets whose remaining time is shortest, but also a total data volume of one or more data packets whose remaining time is not shortest. Therefore, the network device can not only configure, in a timely manner, a resource for the one or more data packets with the shortest remaining time or one or more data packets that is or are about to expire, but also prepare for resource allocation for one or more data packets with second shortest remaining time. Specifically, the BSR may carry the information about the logical channel group and the information about the data volume or data volumes of the one or more data packets with the remaining time within different time periods. FIG. 7 shows another reporting format of a BSR by using the LCG 1 as an example. As shown in FIG. 7, a BSR MAC CE includes at least the following information; the ID of the LCG 1, a volume BS 1 of data that is buffered in the LCG 1 and whose remaining time falls within the time period 0-$t1$, a volume BS 2 of data that is buffered in the LCG 1 and whose remaining time falls within the time period t1-t2, and a volume BS 3 of data that is buffered in the LCG 1 and whose remaining time falls within the time period t2-t3. It should be understood that segment information of a time period within which remaining time of a data packet falls may be configured by the network device for the terminal device through a system message or an RRC message, or may be predefined in a protocol. This is not limited.

It should be understood that the BSR MAC CE formats in FIG. 5 and FIG. 7 are merely examples for description, and do not constitute a limitation on the embodiments of this application.

In a fifth optional implementation, the first message is a buffer status report. The method 200 further includes:

determining, by the terminal device, a first coding scheme based on a third correspondence and the remaining time, where the third correspondence is a correspondence between a coding scheme of a buffer status report and the remaining time of each of the one or more data packets.

S210 includes:

sending, by the terminal device to the network device, the buffer status report encoded by using the first coding scheme. Correspondingly, the network device receives the buffer status report from the terminal device.

In other words, a coding scheme may implicitly indicate remaining time of a data packet, and the terminal device may send a BSR to the network device by using different coding schemes. The network device may learn of the remaining time of the data packet based on different coding schemes.

Specifically, when sending a transport block (TB) including a BSR MAC CE to the network device, the terminal device determines, based on the remaining time of the data packet and the third correspondence, a physical layer coding scheme (for example, the first coding scheme) that needs to be used to send the transport block including the BSR MAC CE, and then sends the transport block including the BSR MAC CE based on the determined physical layer coding scheme. The network device may learn of, by decoding the transport block including the BSR MAC CE, the coding scheme used by the terminal device, and then determine the remaining time of the data packet based on the third correspondence. In addition, if the network device fails to decode the transport block, but can identify the coding scheme used by the terminal device to send the transport block including the BSR MAC CE, the network device can still determine the remaining time of the data packet. If the coding scheme indicates that there is an urgent data packet to be sent by the terminal device, the network device may schedule a resource for the urgent data packet as soon as possible. Optionally, the method for indicating the remaining time of the data packet by using the coding scheme in this embodiment of this application may further be applied to a transport block that does not include a BSR MAC CE. In this case, if the network device fails to decode the transport block, but can identify the coding scheme used for the transport block, the network device may determine the remaining time, of the data packet, included in the TB. In this way, if there is an urgent data packet in the transport block, the network device may schedule a resource as soon as possible for performing hybrid automatic repeat request (HARQ) retransmission on the transport block, to complete new transmission or retransmission of the data packet. This helps improve reliability of urgent data transmission.

Figure 8:
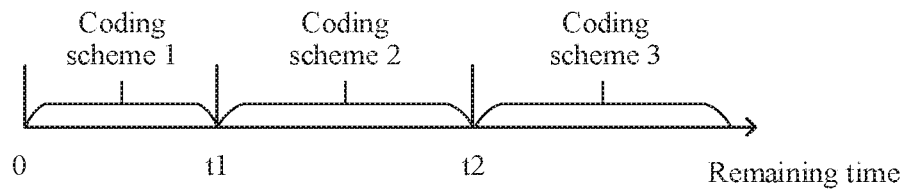
FIG. 8 is a schematic diagram of an example of a third correspondence according to an embodiment of this application.

The third correspondence may be configured by the network device for the terminal device through a system message or an RRC message, or may be predefined in a protocol. This is not limited. FIG. 8 is a schematic diagram of an example of a third correspondence. As shown in FIG. 8, if remaining time of each of one or more data packets falls within a time period 0-t1, the terminal device uses a coding scheme 1; or if remaining time of each of one or more data packets falls within a time period t1-t2 (which may include the time endpoint t1), the terminal device uses a coding scheme 2; or if remaining time of each of one or more data packets is greater than or equal to t2, the terminal device uses a coding scheme 3. For example, when receiving a transport block sent by using the coding scheme 1, the network device may learn that the one or more data packets of the terminal device expires or expire within the time period 0-t1, and needs to allocate a resource to the terminal device as soon as possible.

It should be noted that different coding schemes may be different reference signal (for example, demodulation reference signal (DMRS)) formats or other physical layer coding schemes. This is not limited in this embodiment of this application.

Therefore, the terminal device implicitly indicates the remaining time of the data packet through the used coding scheme, so that the network device can determine, based on the coding scheme, whether a resource needs to be configured for the terminal device.

In a sixth optional implementation, when the network device configures a periodic resource for the terminal device, the first message is a medium access control control element MAC CE, and the remaining time of each of the one or more data packets is remaining time of a data packet that expires before a resource in a next periodicity arrives.

S210 includes:

sending, by the terminal device, the MAC CE to the network device, where the MAC CE includes the information about the remaining time of each of the one or more data packets.

In other words, if the terminal device determines that the one or more data packets in an uplink buffer expires or expire before the next periodic resource arrives, a MAC PDU transmitted on a current uplink resource carries the MAC CE, where the MAC CE includes the information about the remaining time of each of the one or more data packets. Specifically, the MAC CE may include one or more of the following information; indication information indicating whether there is a data packet that expires before the resource in the next periodicity arrives, information about remaining time of the data packet that expires before the resource in the next periodicity arrives, and information about a data volume of the data packet that expires before the resource in the next periodicity arrives. It should be noted that the current uplink resource may be a resource dynamically scheduled by the network device, or may be a periodic resource. This is not limited.

For example, it is assumed that the terminal device receives a periodic resource at a moment 0, and a data volume that can be transmitted on the resource at the moment 0 is N. If the terminal device has a volume, of N+X, of data that expires within a time range 0-T, the terminal device determines that when a resource in a next periodicity (a periodic resource at the moment T) arrives, there is a volume, of X, of data whose transmission latency exceeds an upper limit of a latency range. In this case, the MAC CE may include the volume, of X, of the data that expires when the resource in the next periodicity arrives, and a moment within 0-T at which a data packet expires.

Optionally, the MAC CE may further include the indication information, and the indication information is used to indicate whether there is a data packet that expires before the resource in the next periodicity arrives.

Optionally, the periodic resource may be a configured uplink grant resource, or may be a semi-persistent scheduling (SPS) resource. This is not limited.

Optionally, S220 includes:

configuring, by the network device, the resource for the terminal device before the resource in the next periodicity arrives.

In other words, when the network device configures the periodic resource for the terminal device, if the network device obtains the information about the remaining time of each of the one or more data packets and/or information about a total data volume of the one or more data packets, the network device allocates the resource to the terminal device in advance before the next periodic resource arrives, so that an urgent data packet that appears before the next periodic resource arrives can be transmitted in a timely manner.

Optionally, the MAC CE is further used to indicate information about a total data volume corresponding to the one or more data packets whose respective remaining time meets a preset time threshold before the resource in the next periodicity arrives. That the remaining time meets the preset time threshold may include: the remaining time is greater than or equal to the preset time threshold, or is less than or equal to the preset time threshold.

For example, if the terminal device determines that the remaining time of each of the one or more data packets in the uplink buffer is less than or equal to the preset time threshold before the next periodic resource arrives, the terminal device may indicate, through the MAC CE, the information about the total data volume corresponding to the one or more data packets whose respective remaining time is less than or equal to the preset time threshold before the resource in the next periodicity arrives.

It should be understood that the preset time threshold may be configured by the network device for the terminal device through a system message or an RRC message, or may be predefined in a protocol. This is not limited.

In this embodiment of this application, the information about the total data volume may include the data volume of the data packet. The data volume of the data packet may be an absolute data volume, for example, expressed in bytes/bits, or may be a preconfigured or predefined index value of the data volume. This is not limited.

Optionally, the information about the total data volume corresponding to the one or more data packets includes a data index, and the method 200 further includes:

determining, by the terminal device, the data index based on a fourth correspondence and the total data volume corresponding to the one or more data packets, where the fourth correspondence is a correspondence between a data index and a data volume range within which the total data volume corresponding to the one or more data packets falls.

In other words, the terminal device may report the data index to the network device based on the fourth correspondence and the data volume corresponding to the data packet. Correspondingly, the network device may obtain, based on a value of the data index and the fourth correspondence, the total data volume corresponding to the one or more data packets, to allocate the resource to the terminal device with reference to the total data volume. It should be understood that the data index has a similar meaning to a BS in a BSR MAC CE, and both may indicate one data volume range.

Figure 9:
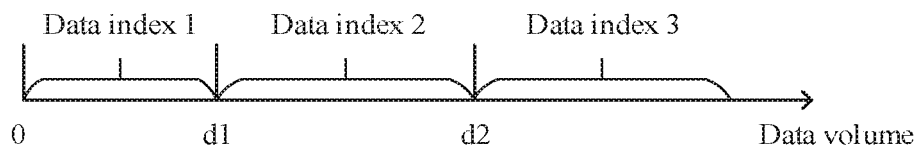
FIG. 9 is a schematic diagram of an example of a fourth correspondence according to an embodiment of this application.

The fourth correspondence may be configured by the network device for the terminal device through a system message or an RRC message, or may be predefined in a protocol. This is not limited. FIG. 9 is a schematic diagram of an example of a fourth correspondence. As shown in FIG. 9, if a total data volume of one or more data packets falls within a data volume range 0-d1, the terminal device reports a data index 1; or if a total data volume of one or more data packets falls within a data volume range d1-d2 (which may include the data volume endpoint d1), the terminal device reports a data index 2; or if a total data volume of one or more data packets is greater than or equal to d2, the terminal device reports a data index 3.

It should be understood that in the foregoing optional implementations, the terminal device may report the information about the data volume of the data packet to the network device. This is not limited in this embodiment of this application.

It should also be understood that the examples in FIG. 3 to FIG. 9 are provided merely to help a person skilled in the art understand the embodiments of this application, instead of limiting the embodiments of this application to specific scenarios shown in the examples. Definitely, a person skilled in the art can make various equivalent modifications or changes based on the examples shown in FIG. 3 to FIG. 9, and such modifications or changes also fall within the scope of the embodiments of this application.

The foregoing describes in detail the data sending method according to the embodiments of this application with reference to FIG. 1 to FIG. 9. The following describes a communications device according to the embodiments of this application with reference to FIG. 10 to FIG. 13. It should be understood that the technical features described in the method embodiment are also applicable to the following apparatus embodiments.

Figure 10:
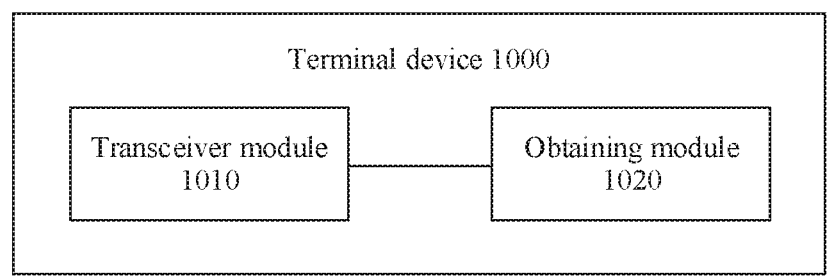
FIG. 10 is a schematic block diagram of a terminal device according to an embodiment of this application.

FIG. 10 is a schematic block diagram of a terminal device 1000 according to an embodiment of this application. As shown in FIG. 10, the terminal device 1000 includes:

a transceiver module 1010, configured to send a first message to a network device, where the first message is used to indicate information about remaining time of each of one or more data packets, and the remaining time of each of the one or more data packets is used to indicate that the terminal device needs to finish sending each of the one or more data packets before the end of the remaining time; and an obtaining module 1020, configured to obtain information about a resource configured by the network device for the terminal device, where the resource is used to send each of the one or more data packets before the end of the remaining time.

In an optional implementation, the first message is a first scheduling request. The terminal device 1000 further includes:

a determining module, configured to determine a configuration of the first scheduling request based on a first correspondence and the remaining time, where the first correspondence is a correspondence between a configuration of a scheduling request and the remaining time of each of the one or more data packets, and the configuration of the first scheduling request includes a resource position occupied by the first scheduling request.

The transceiver module 1010 is specifically configured to:
send the first scheduling request to the network device by using the configuration of the first scheduling request.

In an optional implementation, the first message is further used to indicate information about a total data volume corresponding to the one or more data packets whose respective remaining time meets a preset time threshold, and the first message is a second scheduling request. The terminal device 1010 further includes:

a determining module, configured to determine a configuration of the second scheduling request based on a second correspondence and the information about the total data volume, where the second correspondence is a correspondence between a configuration of a scheduling request and the total data volume of the one or more data packets, and the configuration of the second scheduling request includes a resource position occupied by the second scheduling request.

The transceiver module 1010 is specifically configured to:
send the second scheduling request to the network device by using the configuration of the second scheduling request.

In an optional implementation, the first message is a buffer status report. The terminal device 1000 further includes:

a trigger module, configured to trigger the buffer status report based on one or more of the following conditions (1) to (3):

(1) the remaining time of each of the one or more data packets is less than or equal to a preset time threshold;

(2) the remaining time of each of the one or more data packets is less than or equal to a preset time threshold, and a total data volume of the one or more data packets is greater than or equal to a preset data volume threshold; or (3) the remaining time of each of the one or more data packets is less than or equal to a preset time threshold, and a proportion of a total data volume of the one or more data packets in a total volume of to-be-sent data on a logical channel on which the one or more data packets are located is greater than or equal to a proportion threshold.

The transceiver module 1010 is specifically configured to:
send the buffer status report to the network device.

In an optional implementation, the first message is a buffer status report. The transceiver module 1010 is specifically configured to:
send the buffer status report to the network device, where the buffer status report includes the information about the remaining time of each of the one or more data packets.

In an optional implementation, the buffer status report further includes information about a data volume or data volumes of the one or more data packets, with remaining time within different time periods, on a logical channel on which the one or more data packets are located.

In an optional implementation, the first message is a buffer status report. The terminal device 1000 further includes:

a determining module, configured to determine a first coding scheme based on a third correspondence and the remaining time, where the third correspondence is a correspondence between a coding scheme of a buffer status report and remaining time of a data packet.

The transceiver module 1010 is specifically configured to:
send, to the network device, the buffer status report encoded by using the first coding scheme.

In an optional implementation, when the network device configures a periodic resource for the terminal device, the first message is a medium access control control element MAC CE, and the remaining time of each of the one or more data packets is remaining time of a data packet that expires before a resource in a next periodicity arrives.

The transceiver module 1010 is specifically configured to:
send the MAC CE to the network device, where the MAC CE includes the information about the remaining time of each of the one or more data packets.

In a possible implementation, the obtaining module 1020 is specifically configured to obtain a resource dynamically scheduled by the network device for the terminal device before the resource in the next periodicity arrives.

In a possible implementation, the MAC CE is further used to indicate information about a total data volume corresponding to the one or more data packets whose respective remaining time meets a preset time threshold before the resource in the next periodicity arrives.

In a possible implementation, the information about the total data volume corresponding to the one or more data packets includes a data index, and the terminal device 1000 further includes:

a determining module, configured to determine the data index based on a fourth correspondence and the total data volume corresponding to the one or more data packets, where the fourth correspondence is a correspondence between a data index and a data volume range within which the total data volume corresponding to the one or more data packets falls.

It should be understood that the terminal device 1000 in this embodiment of this application may correspond to the method on a terminal device side in the foregoing method embodiment. The foregoing and other management operations and/or functions of each module in the terminal device 1000 are intended to implement a corresponding step of the foregoing method, and therefore beneficial effects of the foregoing method embodiment may also be implemented. For brevity, details are not described herein again.

Figure 11:
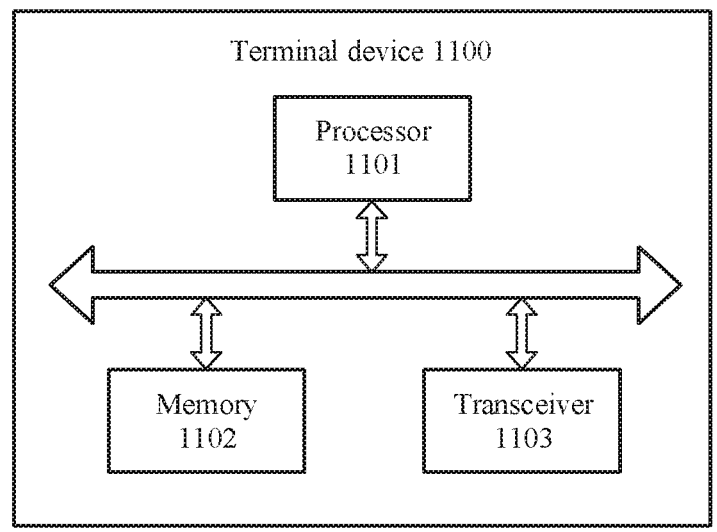
FIG. 11 is a schematic diagram of a structure of a terminal device according to an embodiment of this application.

FIG. 11 is a schematic diagram of a structure of a terminal device 1100 according to an embodiment of this application. As shown in FIG. 11, the terminal device 1100 includes:

a processor 1101, a memory 1102, and a transceiver 1103.

The processor 1101, the memory 1102, and the transceiver 1103 communicate with each other through an internal connection path to transfer a control and/or data signal. In a possible design, the processor 1101, the memory 1102, and the transceiver 1103 may be implemented by a chip. The memory 1102 may store program code, and the processor 1101 invokes the program code stored in the memory 1102, to implement a corresponding function of the terminal device 1100.

The transceiver 1103 is configured to send a first message to a network device, where the first message is used to indicate information about remaining time of each of one or more data packets, and the remaining time of each of the one or more data packets is used to indicate that the terminal device 100 needs to finish sending each of the one or more data packets before the end of the remaining time. The transceiver 1103 is further configured to obtain a resource configured by the network device for the terminal device 1100, where the resource is used to send each of the one or more data packets before the end of the remaining time.

Optionally, the transceiver module 1010 and the obtaining module 1020 in the terminal device 1000 shown in FIG. 10 may correspond to the transceiver 1103 in the terminal device 1100 shown in FIG. 11, and the determining module in the terminal device 1000 may correspond to the processor 1101 in the terminal device 1100 shown in FIG. 11. In another implementation, the transceiver may be implemented by two components: a receiver and a transmitter.

In the embodiment of this application, the terminal device 1000 may be a chip (or a chip system) installed on a terminal device. In this case, the terminal device 1000 may include a processor and an input/output interface. The processor may be communicatively connected to a transceiver of a network device through the input/output interface. Optionally, the apparatus further includes a memory, and the memory is communicatively connected to the processor. Optionally, the processor, the memory, and the transceiver may be communicatively connected. The memory may be configured to store an instruction. The processor is configured to execute the instruction stored in the memory, to control the transceiver to send information or a signal.

It should be understood that the terminal device 1100 in this embodiment of this application may correspond to the method on a terminal device side in the foregoing method embodiment.

Figure 12:
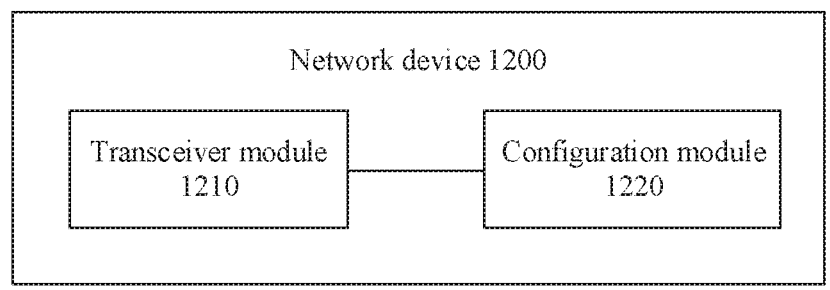
FIG. 12 is a schematic block diagram of a network device according to an embodiment of this application.

FIG. 12 is a schematic block diagram of a network device 1200 according to an embodiment of this application. As shown in FIG. 12, the network device 1200 includes:

a transceiver module 1210, configured to receive a first message sent by a terminal device, where the first message is used to indicate information about remaining time of each of one or more data packets, and the remaining time is remaining time for finishing sending each of the one or more data packets; and a configuration module 1220, configured to configure a resource for the terminal device based on the information about the remaining time, where a time domain position of the resource is before the end of the remaining time.

In an optional implementation, the first message is a first scheduling request. The transceiver module 1210 is specifically configured to:

receive, at a first resource position, the first scheduling request sent by the terminal device.

The network device 1200 further includes:

a determining module, configured to determine the information about the remaining time of each of the one or more data packets based on a first correspondence and the first resource position, where the first correspondence is a correspondence between a configuration of a scheduling request and the remaining time of each of the one or more data packets, and a configuration of the first scheduling request includes a resource position occupied by the first scheduling request.

In an optional implementation, the first message is further used to indicate information about a total data volume corresponding to the one or more data packets whose respective remaining time meets a preset time threshold, and the first message is a second scheduling request. The transceiver module 1210 is specifically configured to:

receive, at a second resource position, the second scheduling request sent by the terminal device.

The network device 1200 further includes:

a determining module, configured to determine the total data volume of the one or more data packets based on the second correspondence and the second resource position, where the second correspondence is a correspondence between a configuration of a scheduling request and the total data volume of the one or more data packets, and a configuration of the second scheduling request includes a resource position occupied by the second scheduling request.

The configuration module 1220 is specifically configured to:

configure the resource for the terminal device based on the total data volume of the one or more data packets and the remaining time.

In an optional implementation, the first message is a buffer status report. The transceiver module 1210 is specifically configured to:

receive the buffer status report sent by the terminal device, where the buffer status report includes the information about the remaining time of each of the one or more data packets.

In an optional implementation, the first message is a buffer status report. The transceiver module 1210 is specifically configured to:

receive the buffer status report sent by the terminal device.

The network device 1200 further includes:

a determining module, configured to determine the remaining time based on a coding scheme corresponding to the buffer status report and a third correspondence, where the third correspondence is a correspondence between a coding scheme of a buffer status report and the remaining time of each of the one or more data packets.

In an optional implementation, when the network device configures a periodic resource for the terminal device, the first message is a medium access control control element MAC CE, and the remaining time of each of the one or more data packets is remaining time of a data packet that expires before a resource in a next periodicity arrives.

The transceiver module 1210 is specifically configured to:

receive the MAC CE sent by the terminal device, where the MAC CE includes the information about the remaining time of each of the one or more data packets.

In an optional implementation, the configuration module 1220 is specifically configured to:

configure the resource for the terminal device before the resource in the next periodicity arrives.

In a possible implementation, the MAC CE is further used to indicate information about a total data volume corresponding to the one or more data packets whose respective remaining time meets a preset time threshold before the resource in the next periodicity arrives.

It should be understood that the network device 1200 in this embodiment of this application may correspond to the method on a network device side in the foregoing method embodiment. The foregoing and other management operations and/or functions of each module in the network device 1200 are intended to implement a corresponding step of the foregoing method, and therefore beneficial effects of the foregoing method embodiment may also be implemented. For brevity, details are not described herein again.

Figure 13:
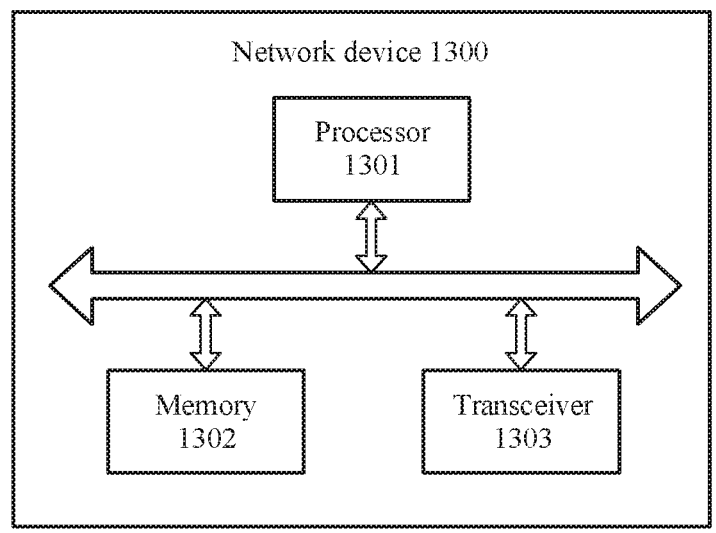
FIG. 13 is a schematic diagram of a structure of a network device according to an embodiment of this application.

FIG. 13 is a schematic diagram of a structure of a network device 1300 according to an embodiment of this application. As shown in FIG. 13, the network device 1300 includes:

a processor 1301, a memory 1302, and a transceiver 1303.

The processor 1301, the memory 1302, and the transceiver 1303 communicate with each other through an internal connection path, to transfer a control and/or data signal. In a possible design, the processor 1301, the memory 1302, and the transceiver 1303 may be implemented by a chip. The memory 1302 may store program code, and the processor 1301 invokes the program code stored in the memory 1302, to implement a corresponding function of the network device.

The transceiver 1303 is configured to receive a first message sent by a terminal device, where the first message is used to indicate information about remaining time of each of one or more data packets, and the remaining time is remaining time for finishing sending each of the one or more data packets. The processor 1301 is configured to configure a resource for the terminal device based on the information about the remaining time, where a time domain position of the resource is before the end of the remaining time.

Optionally, the transceiver module 1210 in the network device 1200 shown in FIG. 12 may correspond to the transceiver 1303 in the network device 1300 shown in FIG. 13, and the configuration module 1220 may correspond to the processor 1301 in the network device 1300 shown in FIG. 13. In another implementation, the transceiver 1303 may be implemented by two components: a receiver and a transmitter.

In the embodiment of this application, the network device 1200 may be a chip (or a chip system) installed on a network device. In this case, the network device 1200 may include a processor and an input/output interface. The processor may be communicatively connected to a transceiver of the network device through the input/output interface. Optionally, the apparatus further includes a memory, and the memory is communicatively connected to the processor. Optionally, the processor, the memory, and the transceiver may be communicatively connected. The memory may be configured to store an instruction. The processor is configured to execute the instruction stored in the memory to control the transceiver to send information or a signal.

It should be understood that the network device 1300 in this embodiment of this application may correspond to the method on a network device side in the foregoing method embodiment.

The method disclosed in the embodiments of this application may be applied to a processor or may be implemented by a processor. The processor may be an integrated circuit chip and has a signal processing capability. In an implementation process, the steps in the foregoing method embodiment may be implemented by a hardware integrated logical circuit in the processor, or by instructions in a form of software. The processor may be a general purpose processor, a digital signal processor (DSP), an application specific integrated circuit (ASIC), a field programmable gate array (FPGA) or another programmable logic device, a discrete gate, a transistor logic device, a discrete hardware component, a system on chip (SoC), a central processing unit CPU), a network processor (NP), a digital signal processing circuit (digital signal processor, DSP), a micro controller unit (MCU), a programmable controller (programmable logic device, PLD), or another integrated chip. The processor may implement or perform the method, steps, and logical block diagrams that are disclosed in the embodiments of this application. The general purpose processor may be a microprocessor, or the processor may be any conventional processor or the like. Steps of the method disclosed with reference to the embodiments of this application may be directly executed and completed by a hardware decoding processor, or may be executed and completed by a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing method in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM). It should be noted that the memory of the system and method described in this specification includes but is not limited to these memories and any other proper type of memory.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiments are merely examples. For example, division to the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in the form of a software product. The computer software product is stored in a storage medium, and includes instructions for instructing a computer device (which may be a personal computer, a server, or a network device) to perform all or some of the steps of the method described in the embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data sending method, comprising:
    sending, by a terminal device, a first message to a network device, wherein the first message is used to indicate information about remaining time of each of one or more data packets, wherein the remaining time of each of one or more data packets as indicated in the first message comprises a time period that remains before a timer corresponding to the one or more data packets expires, and wherein the remaining time of each of the one or more data packets as indicated in the first message is used to indicate that the terminal device needs to finish sending each of the one or more data packets before an end of the remaining time; and
    obtaining, by the terminal device, information about a resource configured by the network device for the terminal device, wherein the resource is used to send each of the one or more data packets before the end of the remaining time.

2. The method according to claim 1, wherein the first message is a first scheduling request, and wherein the method further comprises:
    determining, by the terminal device, a configuration of the first scheduling request based on a first correspondence and the remaining time of each of the one or more data packets, wherein the first correspondence comprises a correspondence between the configuration of the first scheduling request and the remaining time of each of the one or more data packets, and wherein the configuration of the first scheduling request comprises a resource position occupied by the first scheduling request; and
    wherein sending, by the terminal device, the first message to the network device comprises:
        sending, by the terminal device, the first scheduling request to the network device by using the configuration of the first scheduling request.

3. The method according to claim 1, wherein the first message is further used to indicate information about a total data volume corresponding to the one or more data packets whose respective remaining time meets a preset time threshold, wherein the first message is a second scheduling request, and wherein the method further comprises:
    determining, by the terminal device, a configuration of the second scheduling request based on a second correspondence and the information about the total data volume, wherein the second correspondence comprises a correspondence between the configuration of the second scheduling request and the total data volume of the one or more data packets, and wherein the configuration of the second scheduling request comprises a resource position occupied by the second scheduling request; and wherein sending, by the terminal device, the first message to the network device comprises:

sending, by the terminal device, the second scheduling request to the network device by using the configuration of the second scheduling request.

4. The method according to claim 1, wherein the first message is a buffer status report, and wherein the method further comprises:

triggering, by the terminal device, the buffer status report based on one or more of the following conditions (1) to (3):

(1) the remaining time of each of the one or more data packets is less than or equal to a preset time threshold;

(2) the remaining time of each of the one or more data packets is less than or equal to a preset time threshold, wherein a total data volume of the one or more data packets is greater than or equal to a preset data volume threshold; or (3) the remaining time of each of the one or more data packets is less than or equal to a preset time threshold, wherein a proportion of a total data volume of the one or more data packets in a total volume of to-be-sent data on a logical channel on which the one or more data packets are located is greater than or equal to a proportion threshold; and wherein sending, by the terminal device, the first message to the network device comprises:

sending, by the terminal device, the buffer status report to the network device.

5. The method according to claim 1, wherein the first message is a buffer status report, and wherein sending, by the terminal device, the first message to the network device comprises:

sending, by the terminal device, the buffer status report to the network device, wherein the buffer status report comprises the information about the remaining time of each of the one or more data packets.

6. The method according to claim 5, wherein the buffer status report further comprises information about a data volume or data volumes of the one or more data packets, with remaining time within different time periods, on a logical channel on which the one or more data packets are located.

7. The method according to claim 1, wherein when the network device configures a periodic resource for the terminal device, the first message is a medium access control (MAC) control element (CE), and wherein the remaining time of each of the one or more data packets is remaining time of a data packet that expires before a resource in a next periodicity arrives; and wherein sending, by the terminal device, the first message to the network device comprises:

sending, by the terminal device, the MAC CE to the network device, wherein the MAC CE comprises the information about the remaining time of each of the one or more data packets.

8. The method according to claim 7, wherein the MAC CE is further used to indicate information about a total data volume corresponding to the one or more data packets whose respective remaining time meets a preset time threshold before the resource in the next periodicity arrives.

9. A data sending method, comprising:

receiving, by a network device, a first message sent by a terminal device, wherein the first message is used to indicate information about remaining time of each of one or more data packets, wherein the remaining time of each of one or more data packets as indicated in the first message comprises a time period that remains before a timer corresponding to the one or more data packets expires, and wherein the remaining time of each of the one or more data packets as indicated in the first message is remaining time for finishing sending each of the one or more data packets; and configuring, by the network device, a resource for the terminal device based on the information about the remaining time, wherein a time domain position of the resource is before an end of the remaining time.

10. The method according to claim 9, wherein the first message is a first scheduling request, and wherein receiving, by the network device, the first message sent by the terminal device comprises:

receiving, by the network device at a first resource position, the first scheduling request sent by the terminal device; and wherein the method further comprises:

determining, by the network device, the remaining time of each of the one or more data packets based on a first correspondence and the first resource position, wherein the first correspondence comprises a correspondence between a configuration of the first scheduling request and the remaining time of each of the one or more data packets, and wherein the configuration of the first scheduling request comprises a resource position occupied by the first scheduling request.

11. The method according to claim 9, wherein the first message is further used to indicate information about a total data volume corresponding to the one or more data packets whose respective remaining time meets a preset time threshold, wherein the first message is a second scheduling request, and wherein receiving, by the network device, the first message sent by the terminal device comprises:

receiving, by the network device at a second resource position, the second scheduling request sent by the terminal device;

wherein the method further comprises:

determining, by the network device, the total data volume of the one or more data packets based on a second correspondence and the second resource position, wherein the second correspondence is a correspondence between a configuration of the second scheduling request and the total data volume of the one or more data packets, and wherein the configuration of the second scheduling request comprises a resource position occupied by the second scheduling request; and wherein configuring, by the network device, the resource for the terminal device based on the information about the remaining time comprises:

configuring, by the network device, the resource for the terminal device based on the total data volume of the one or more data packets and the remaining time.

12. The method according to claim 9, wherein the first message is a buffer status report, and wherein the receiving, by the network device, the first message sent by the terminal device comprises:

receiving, by the network device, the buffer status report sent by the terminal device, wherein the buffer status report comprises the information about the remaining time of each of the one or more data packets.

13. The method according to claim 12, wherein the buffer status report further comprises information about a data volume or data volumes of the one or more data packets, with remaining time within different time periods, on a logical channel on which the one or more data packets are located.

14. The method according to claim 9, wherein when the network device configures a periodic resource for the terminal device, the first message is a medium access control (MAC) control element (CE), and wherein the remaining time of each of the one or more data packets is remaining time of a data packet that expires before a resource in a next periodicity arrives; and
wherein receiving, by the network device, the first message sent by the terminal device comprises:
receiving, by the network device, the MAC CE sent by the terminal device, wherein the MAC CE comprises the information about the remaining time of each of the one or more data packets.

15. The method according to claim 14, wherein the configuring, by the network device, the resource for the terminal device based on the information about the remaining time comprises:
configuring, by the network device, the resource for the terminal device before the resource in the next periodicity arrives.

16. The method according to claim 14, wherein the MAC CE is further used to indicate information about a total data volume corresponding to the one or more data packets whose respective remaining time meets a preset time threshold before the resource in the next periodicity arrives.

17. A terminal device, comprising:
at least one processor; and
a memory storing instructions executable by the at least one processor, wherein the instructions, when executed by the at least one processor, cause the terminal device to perform operations comprising:
sending a first message to a network device, wherein the first message is used to indicate information about remaining time of each of one or more data packets, wherein the remaining time of each of one or more data packets as indicated in the first message comprises a time period that remains before a timer corresponding to the one or more data packets expires, and wherein the remaining time of each of the one or more data packets as indicated in the first message is used to indicate that the terminal device needs to finish sending each of the one or more data packets before an end of the remaining time; and
obtaining information about a resource configured by the network device for the terminal device, wherein the resource is used to send each of the one or more data packets before the end of the remaining time.

18. The terminal device according to claim 17, wherein the first message is a first scheduling request, and wherein the operations further comprise:
determining a configuration of the first scheduling request based on a first correspondence and the remaining time of each of the one or more data packets, wherein the first correspondence is a correspondence between the configuration of the first scheduling request and the remaining time of each of the one or more data packets, and wherein the configuration of the first scheduling request comprises a resource position occupied by the first scheduling request; and
sending the first scheduling request to the network device by using the configuration of the first scheduling request.

19. The terminal device according to claim 17, wherein the first message is further used to indicate information about a total data volume corresponding to the one or more data packets whose respective remaining time meets a preset time threshold, wherein the first message is a second scheduling request, and wherein the operations further comprise:
determining a configuration of the second scheduling request based on a second correspondence and the information about the total data volume, wherein the second correspondence is a correspondence between the configuration of the second scheduling request and the total data volume of the one or more data packets, and wherein the configuration of the second scheduling request comprises a resource position occupied by the second scheduling request; and
sending the second scheduling request to the network device by using the configuration of the second scheduling request.

20. The terminal device according to claim 17, wherein the first message is a buffer status report, and wherein the operations further comprise:
triggering the buffer status report based on one or more of the following conditions (1) to (3):
(1) the remaining time of each of the one or more data packets is less than or equal to a preset time threshold;
(2) the remaining time of each of the one or more data packets is less than or equal to a preset time threshold, wherein a total data volume of the one or more data packets is greater than or equal to a preset data volume threshold; or
(3) the remaining time of each of the one or more data packets is less than or equal to a preset time threshold, wherein a proportion of a total data volume of the one or more data packets in a total volume of to-be-sent data on a logical channel on which the one or more data packets are located is greater than or equal to a proportion threshold; and
sending the buffer status report to the network device.

* * * * *